United States Patent
Yanagita et al.

(10) Patent No.: US 7,329,873 B2
(45) Date of Patent: Feb. 12, 2008

(54) COINCIDENCE COUNTING METHOD OF γ RAY AND NUCLEAR MEDICINE DIAGNOSTIC APPARATUS

(75) Inventors: Norihito Yanagita, Hitachi (JP);
Yuuichirou Ueno, Hitachi (JP);
Kensuke Amemiya, Hitachinaka (JP);
Hiroshi Kitaguchi, Naka (JP);
Katsutoshi Tsuchiya, Hitachi (JP);
Shinichi Kojima, Hitachi (JP);
Kazuma Yokoi, Hitachi (JP); Takafumi Ishitsu, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/949,403

(22) Filed: Sep. 27, 2004

(65) Prior Publication Data

US 2005/0067571 A1    Mar. 31, 2005

(30) Foreign Application Priority Data

Sep. 29, 2003    (JP)    ............................... 2003-338601

(51) Int. Cl.
*G01T 1/00*    (2006.01)
(52) U.S. Cl. ................................. 250/363.03
(58) Field of Classification Search ........... 250/363.03, 250/363.09, 363.02, 363.01, 362
See application file for complete search history.

(56) References Cited

U.S. PATENT DOCUMENTS

| | | | |
|---|---|---|---|
| 5,023,894 A | 6/1991 | Yamashita et al. | |
| 5,793,045 A | 8/1998 | DiFilippo et al. | |
| 5,969,358 A | 10/1999 | DiFilippo et al. | |
| 7,058,440 B2 * | 6/2006 | Heuscher et al. | ........... 600/428 |

FOREIGN PATENT DOCUMENTS

| | | |
|---|---|---|
| JP | 11-052059 | 2/1999 |
| JP | 11-72566 | 3/1999 |
| JP | 2003-4853 | 1/2003 |

* cited by examiner

*Primary Examiner*—David Porta
*Assistant Examiner*—Marcus H Taningco
(74) *Attorney, Agent, or Firm*—Dickstein Shapiro LLP

(57) ABSTRACT

A γ-ray signal processing section 60' determines a detection time of a γ ray based on a γ-ray detection signal outputted from a semiconductor radiation detector for detecting the γ ray, and determines the energy of the γ ray. Then, a time correction circuit 70 obtains, based on the energy of the γ ray, a detection value of the detection time that corresponds to the energy of the γ ray from a time correction table indicating the relationship between the energy of the γ ray and the correction value of the detection time of the γ ray, and corrects the detection time according to the obtained correction value of the detection time. Coincidence counting is performed on the γ ray in a coincidence counting circuit 80 based on the corrected detection time.

16 Claims, 10 Drawing Sheets

COINCIDENCE COUNTING METHOD OF γ RAY AND NUCLEAR MEDICINE DIAGNOSTIC APPARATUS

BACKGROUND OF THE INVENTION

The present invention relates to a coincidence counting method of γ rays (gamma rays) in a nuclear medicine diagnostic apparatus, for example positron emission tomography (PET).

Diagnostic methods and diagnostic apparatuses are known in which a radioactive agent such as fluorodeoxyglucose (FDG) is injected to a patient and annihilation γ rays, which are emitted simultaneously in pairs in opposite directions from the body, are detected to create a functional image (PET image). In such diagnostic methods and diagnostic apparatuses, γ rays emitted in opposite directions from the body are simultaneously detected by two of a plurality of detectors provided in the diagnostic apparatus, so that the incident direction (emitting direction) of the γ ray is identified and a PET image used for a medical diagnosis is created. Considering that a detection time is delayed in the detectors, processing is delayed in a detection circuit, and three or more γ rays are not spontaneously detected, an extremely small time window of, e.g., 8 nsecs ($8 \times 10^{-9}$ seconds) is provided. When a subsequent γ ray is detected within 8 nsecs after the first γ ray is detected, the first detected γ ray and the subsequently detected γ ray are regarded as being emitted from the same source (γ rays emitted in a pair) and are counted (coincidence counting), and the detection results of the γ rays are used to create a PET image. On the other hand, when a subsequent γ ray is not detected within 8 nsecs, a PET image is not created based on the detection result of the first detected γ ray (JP-A-11-72566, claims and 0021). That is, a time window with a predetermined width is set and two γ rays detected in the time window are judged as γ rays generated at the same time.

γ rays are highly penetrating and hardly interact with substances. However, in some cases, γ rays interact with water and elements consisting of a detector and are scattered in a living body and the detector, and the γ rays lose some energy thereof (in vivo scattering, Compton scattering). In this case, the detector does not detect γ rays with energy of 511 keV but detects γ rays with low energy of 200 keV or 400 keV, which is considerably lower than 511 keV. γ rays with low energy may be detected for other reasons. Moreover, annihilation γ rays of fluorine 18 ($^{18}F$) has energy of 511 keV.

Conventionally, it is not possible to correctly determine the emitting directions of the γ rays scattered with low energy (scattered ray, etc.) and thus a threshold value is set to prevent the detection results of low energy γ rays from being used to create an image (JP-A-2003-4853, claims, 0021, FIG. 7). However, considering that valuable detection results are also obtained from low energy γ rays and thus sensitivity has to be increased without placing a burden on patients and health care workers, attempts have been made to create a PET image using scattered ray in recent years.

Coincidence counting is performed as described above also when scattered ray is used to create a PET image. Experiments conducted by the present inventors proved a difference in detection time between a γ ray with normal energy (γ ray in a PP area, which will be described later) and a low energy γ ray scattered by Compton scattering (γ ray in a CS area, which will be described later). When detection data with a difference in detection time on scattered ray are used, γ rays originally detected at the same time (within a predetermined time window) may be judged as γ rays detected at different times or γ rays not being detected at the same time (within the predetermined time window) may be judged as γ rays detected at the same time. Further, it was found that when coincidence counting is performed over a wide range from high energy γ rays not being scattered (γ rays in the PP area) to low energy γ rays having been scattered (γ rays in the CS area), the low energy γ rays cannot be used due to the time difference unless the time window widened. Moreover, a wider time window is not preferable because other γ rays with different sources are more likely to be detected spontaneously.

Thus, it is an object of the present invention to solve the problems of coincidence counting using scattered ray of low energy.

SUMMARY OF THE INVENTION

A coincidence counting method of a γ ray (nuclear medicine diagnostic apparatus) of the present invention (the invention of a first view) for solving the problems is characterized by performing (comprising) a step (function) of determining the detection time of a γ ray based on a detection signal outputted from a detector for detecting the γ ray, a step (function) of determining the energy of the γ ray based on the detection signal of the γ ray, a step (function) of obtaining, based on the energy of the γ ray, a correction value of the detection time from a time correction table indicating the relationship between the energy of the γ ray and the correction value of the detection time of the γ ray, the correction value corresponding to the energy of the γ ray, a step (function) of correcting the detection time based on the obtained correction value of the detection time, and a step (function) of performing coincidence counting of the γ ray based on the corrected detection time.

In the configuration according to the invention of the first aspect, the detection time of the γ ray is corrected according to the energy of the γ ray by using the time correction table indicating the relationship between the energy of the γ ray and the correction value of the detection time of the γ ray. Besides, as will be described later, the time correction table can be replaced with a time correction function which calculates a correction value of the detection time of a γ ray according to the energy of the γ ray.

A coincidence counting method of a γ ray (nuclear medicine diagnostic apparatus) of the present invention (the invention of a second view) for solving the problems is characterized by performing (comprising) a step (function) of determining the detection time of a γ ray based on a detection signal outputted from a detector for detecting the γ ray, a step (function) of determining the energy of the γ ray based on the detection signal of the γ ray, a step (function) of calculating a difference in energy between a first detected γ ray and a subsequently detected γ ray which are to be subjected to coincidence counting, a step (function) of obtaining or correcting, based on the difference in energy, a time window whose width corresponds to the difference in energy from a time window table or time window correction table indicating the relationship between the difference in the energy of the γ rays to be subjected to coincidence counting and the width of the time window, a step (function) of calculating a difference in detection time between the first detected γ ray and the subsequently detected γ ray, and a step (function) of comparing the time window having the obtained or corrected width with the difference in detection time, judging coincidence when the difference in detection time is smaller, and performing coincidence counting.

In the configuration according to the invention of the second aspect, the width of the time table is determined (the width of the time window is made variable/the width of the time window is corrected) based on a difference in the energy of γ rays by using the time window table/time window correction table indicating the relationship between the difference in the energy of γ rays to be subjected to coincidence counting and the width of the time window. Further, the time window table/time window correction table can be also replaced with a time window calculating function (time window correction function).

The present invention can achieve remarkable effects as described below.

According to the coincidence counting method of a γ ray and the nuclear medicine diagnostic apparatus of the present invention (the invention of the first aspect), the detection time of a γ ray is corrected according to the energy of the detected γ ray. Thus, even the time window has the same width, coincidence counting can be precisely performed over a wider range of energy. Further, for example, the time window can have a fixed narrow width, thereby minimizing the influence of other γ rays detected spontaneously.

Further, according to the coincidence counting method of a γ ray and the nuclear medicine diagnostic apparatus of the present invention (the invention of the second aspect), the width of the time window can be varied (corrected) according to the energy of the detected γ ray. Thus, the coincidence counting can be precisely performed on γ rays over a wide range of energy. Moreover, it is possible to minimize the influence of other γ rays detected spontaneously as compared with the case where the time window remains wide.

Other objects, features and advantages of the invention will become apparent from the following description of the embodiments of the invention taken in conjunction with the accompanying drawings.

BRIEF DESCRIPTION OF THE DRAWINGS

FIG. 12B schematically shows the principle of a CFD method.

DESCRIPTION OF THE EMBODIMENTS

Preferred embodiments (hereinafter abbreviated as "embodiments") for implementing a coincidence counting method of γ rays and a nuclear medicine diagnostic apparatus will be specifically described below with reference to the accompanying drawings.

Embodiments 1 and 2 described below use scattered ray. Embodiment 1 has a fixed time window and Embodiment 2 has a variable time window.

Embodiment 1

First, regarding Embodiment 1 using scattered ray with a fixed time window, a principle, a concrete example, and the operations of the concrete example will be discussed in this order.

[Principle]

The principle of Embodiment 1 will be discussed below.

Figure 1:
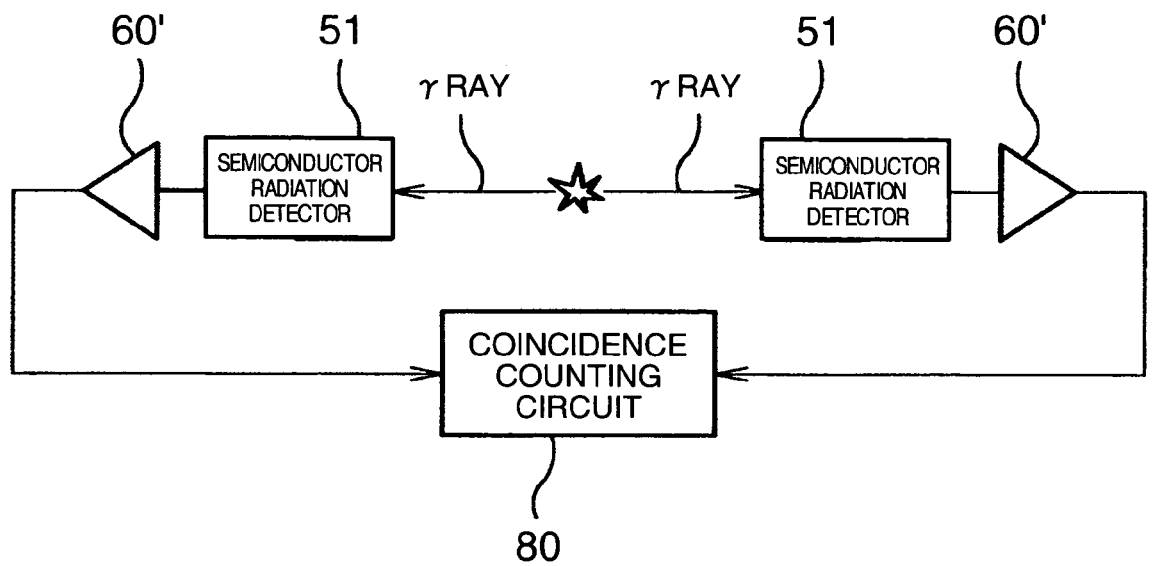
FIG. 1 is a block diagram showing an experimental apparatus used in Embodiment 1.

First, the present inventors clarified the relationship between energy (peak value) of a γ ray detected by a semiconductor radiation detector 51 and a difference in detection time (detection time difference) by using an experimental apparatus simplified in FIG. 1. The experimental apparatus of FIG. 1 comprises the semiconductor radiation detector 51 which acts as a detector for detecting γ rays and is made of cadmium telluride (CdTe), a circuit (γ-ray signal processing section 60') which has the function of determining the energy of a detected γ ray and determining a detection time, and a coincidence counting circuit 80 which has the function of measuring a detection time difference relative to energy based on the energy and the detection time.

Annihilation γ rays (γ rays in a pair emitted in opposite directions by 180°) of $^{18}F$ with 511 keV that are generally used in PET examinations were generated in the experimental apparatus, and experiments were repeated to measure the energy of γ rays detected by the semiconductor radiation detector 51 and a difference in detection time of the γ rays.

Figure 2:
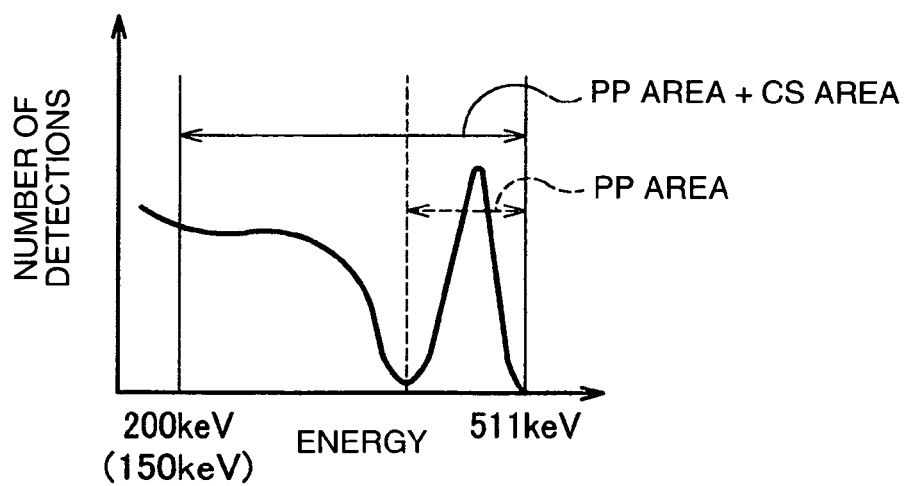
FIG. 2 is a diagram showing the detecting characteristics of a semiconductor radiation detector.
Figure 3:
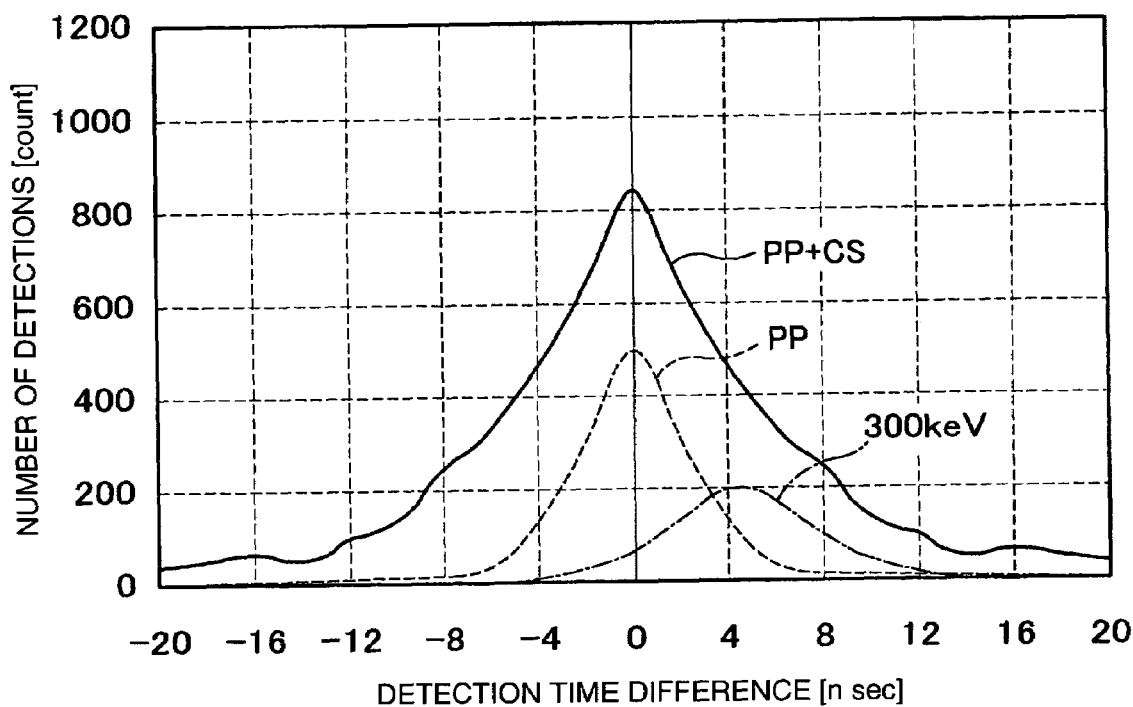
FIG. 3 is a diagram showing the relationship between a detection time and the number of detections (the number of counts) based on a difference in the energy of detected γ rays.

As a result, graphs shown in FIGS. 2 and 3 were obtained. In FIG. 2, a horizontal axis represents the energy of γ rays and a vertical axis represents the number of detections of γ rays (the number of counts) In FIG. 3, a horizontal axis represents a detection time difference and a vertical axis represents the number of detections of γ rays (the number of counts) In FIG. 2, an area from 450 to 550 keV including 511 keV is a photopeak area (PP). Further, an area from 200 (or 150) to 550 keV is a photopeak (PP) area+Compton scattering (CS) area. Incidentally, in the CS area, γ rays originally having energy of 511 keV are actually detected with energy lower than that of the PP area due to Compton scattering.

As indicated by a broken line in FIG. 3, a difference in detection time of γ rays in the PP area of FIG. 2 is within about ±8 nsec. That is, regarding the energy of a pair of γ rays detected in the PP area, it is possible to positively perform coincidence counting on the γ rays generated in a pair by setting a time window with a width of 8 nsec. A difference in detection time between γ rays in the PP area+CS area in FIG. 2 is within about ±12 nsec (16 nsec) as indicated by a solid line in FIG. 3. That is, it is understood that regarding the energy of the pair of detected γ rays in the PP area+CS area, in other words, when γ rays down to 200 keV are subjected to coincidence counting, coincidence counting can be performed almost positively on γ rays generated in a pair by setting a time window with a width of 12 nsec (16 nsec).

However, it is also understood that simply with a wider time window, it is more likely to spontaneously detect other γ rays as γ rays detected at the same time (simply a wider time window reduces sensitivity in effect).

Figure 4:
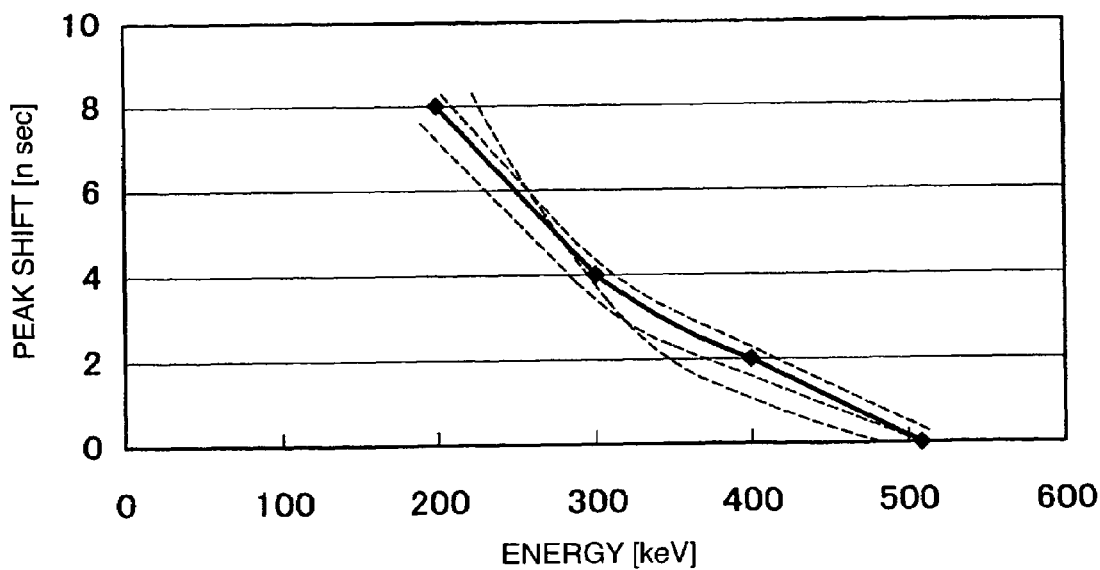
FIG. 4 is a diagram showing the relationship between the energy of the detected γ ray and a peak shift (a correction value of a detection time) (a diagram showing a time correction table of Embodiment 1)

It was found that as shown in FIG. 3 by dashed lines, when one of γ rays generated in a pair is present in the PP area of 500 keV (γ ray detected in the PP area) and the other is present in the CS area of 300 keV (γ ray detected in the CS area), a detection time difference of 4 nsec is made at the median value. In other words, it was found that the peak of the detection time difference is shifted by 4 nsec. The present inventors further examined the facts and found that as detected γ rays have lower energy, detection time is delayed (FIG. 4). Further, the inventors found that coincidence counting using γ rays (γ rays from 200(150) to 550 keV) widely from the PP area to the CS area can be performed by correcting the delay without widening the time window.

In FIG. 4 showing an example of a time correction table, a horizontal axis represents the energy of detected γ rays (keV) and a vertical axis represents a peak shift (nsec) serving as a correction value of a detection time. In FIG. 4, a peak shift of a γ ray is plotted at each energy with 511 keV (511 keV or more) serving as a peak shift of 0. It is understood that as energy decreases, a peak shift increases (increases in + direction). That is, FIG. 4 shows that when a γ ray with energy 400 keV is detected, the detection time (measurement value) is delayed by 2 nsec relative to a γ ray with energy of 511 keV (peak shift+2 nsec). Further, FIG. 4 shows that when a γ ray with energy of 300 keV is detected, the detection time (measurement value) is delayed by 4 nsec relative to a γ ray with energy of 511 keV (peak shift+4 nsec) Further, FIG. 4 shows that when a γ ray with energy of 200 keV is detected, the detection time (measurement value) is delayed by 8 nsec relative to a γ ray with energy of 511 keV (peak shift+8 nsec). Therefore, the following is understood: when a γ ray with energy of 400 keV is detected, the detection time is advanced by 2 nsec (the correction value of a peak shift−2 nsec), when a γ ray with energy of 300 keV is detected, the detection time is advanced by 4 nsec (a correction value of a peak shift−4 nsec), and when a γ ray with energy of 200 keV is detected, the detection time is advanced by 8 nsec (correction value of the peak shift−8 nsec).

Referring to FIG. 4, a concrete example of peak correction will be discussed below. When successively detected γ rays have energy of 511 keV, neither of the γ rays requires peak shift correction. Further, when one of successively detected γ rays has energy of 511 keV and the other has energy of 400 keV, peak shift correction is performed to subtract 2 nsec from the detection time of the γ ray of 400 keV. When one of successively detected γ rays has energy of 511 keV and the other has energy of 200 keV, peak shift correction is performed to subtract 8 nsec from the detection time of the γ ray of 200 keV.

Moreover, when one of successively detected γ rays has energy of 400 keV and the other also has energy of 400 keV, peak shift correction is performed to subtract 2 nsec from the detection time of each of the γ rays. When one of successively detected γ rays has energy of 400 keV and the other has energy of 300 keV, peak shift correction is performed to subtract 2 nsec from the detection time of the γ ray of 400 keV and peak shift correction is performed to subtract 4 nsec from the detection time of the γ ray of 300 keV.

That is, a peak shift is corrected (detection time is corrected) according to the energy of a detected γ ray.

When the energy of a γ ray is a median value including 260 keV and 385 keV, a peak shift (correction value) can be determined from energy values by using a time correction table and a time correction map which describe more specific values, and correlation equations (time correction functions) which include a linear function, a secondary function, and an exponential function and indicate the relationship between energy and a peak shift. That is, even when the time correction table is replaced with a time correction function for calculating a correction value of the detection time of a γ ray according to the energy of the detected γ ray, the object of the present invention can be attained. For this reason, it is assumed that the time correction function is included in the concept of the time correction table (time correction table=time correction function).

Incidentally, FIG. 4 shows that 511 keV is set at a peak shift of 0 as an example. It is needless to say that 400 keV or 200 keV may be set at 0.

Figure 5:
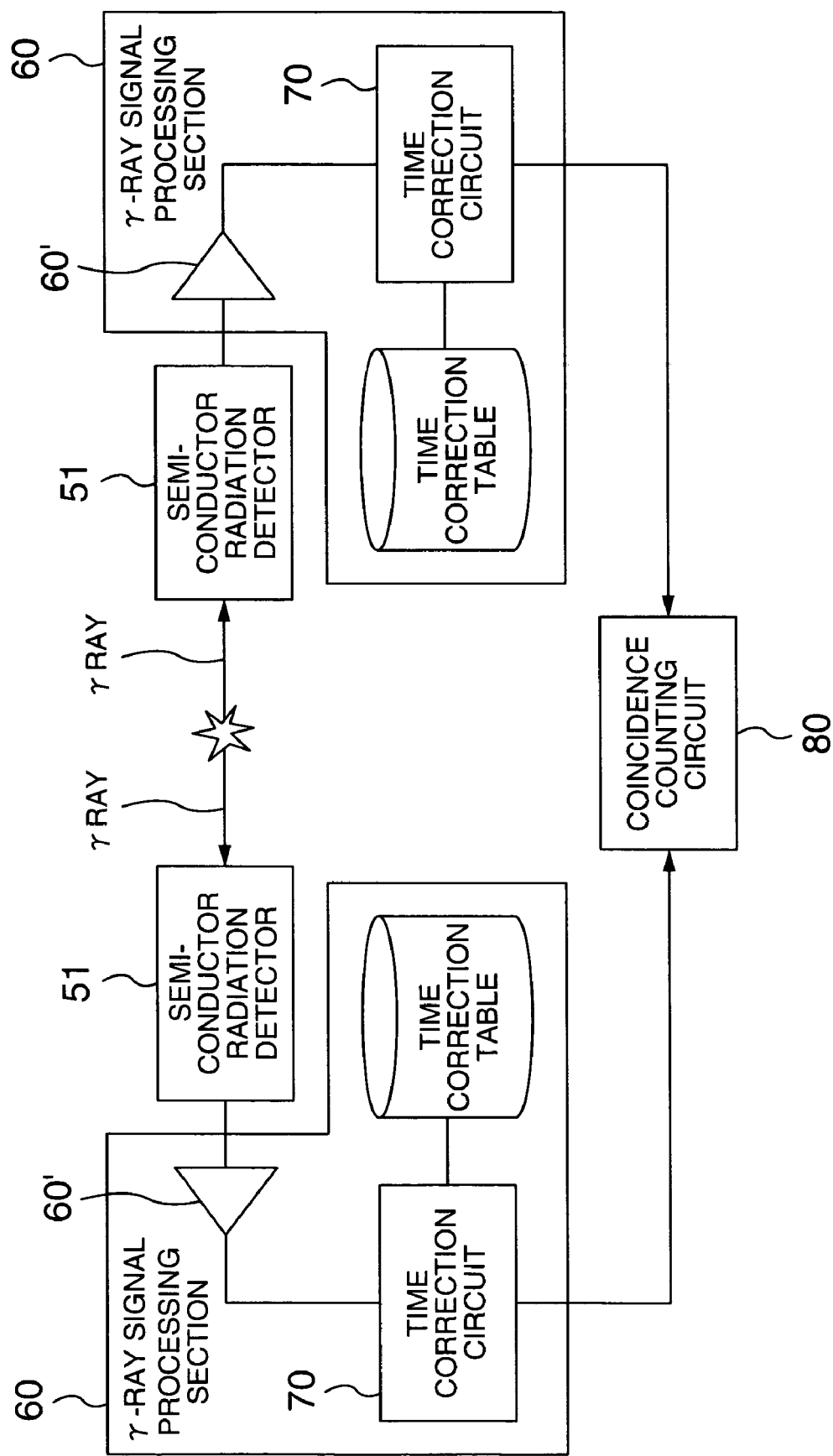
FIG. 5 is a block diagram showing the experimental apparatus used in Embodiment 1 (with a time correction circuit)

Subsequently, the present inventors conducted experiments for correcting the detection time of a γ ray according to the energy of the γ ray detected by the semiconductor radiation detector 51, by using an experimental apparatus simplified in FIG. 5. The experimental apparatus of FIG. 5 is different from that of FIG. 1 in that a time correction circuit 70 and a time correction table used in the time correction circuit 70 are provided in the previous stage of a coincidence counting circuit 80. Other configurations are similar to those of the experimental apparatus shown in FIG. 1 and thus the explanation thereof is omitted. A method of correcting a detection time is also similar to the above described method, in which a corresponding correction value is obtained from the time correction table according to the energy of a detected γ ray and the correction value is subtracted from the detection time. Thus, further explanation is omitted.

Figure 6:
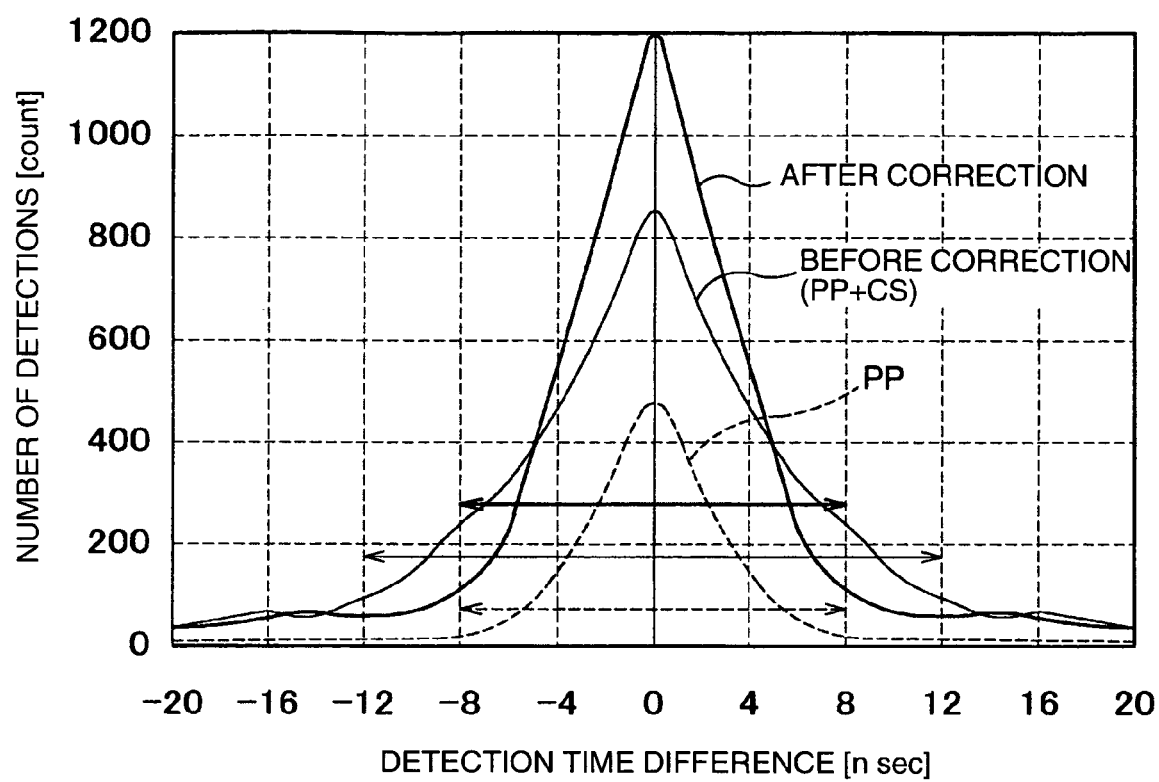
FIG. 6 is a diagram showing experiment results obtained in the experimental apparatus of FIG. 5.

FIG. 6 shows experimental results obtained in the experimental apparatus of FIG. 5. In FIG. 6, a relatively thick solid line represents a curve after correction and a relatively thin solid line represents a curve before correction (similar to the curve of the solid line of FIG. 3). As shown in FIG. 6, a detection time difference of ±12 nsec (16 nsec) before correction could be reduced to ±8 nsec. Accordingly, the peak of the curve could be increased. That is, FIG. 6 shows that a time window of 8 nsec enables proper coincidence counting to be performed on γ rays over a wide range from 200 to 550 keV (PP area+CS area). Further, FIG. 6 shows that the influence of other γ rays detected spontaneously can be minimized by setting such a narrow time window.

[Concrete Example]

Figure 7:
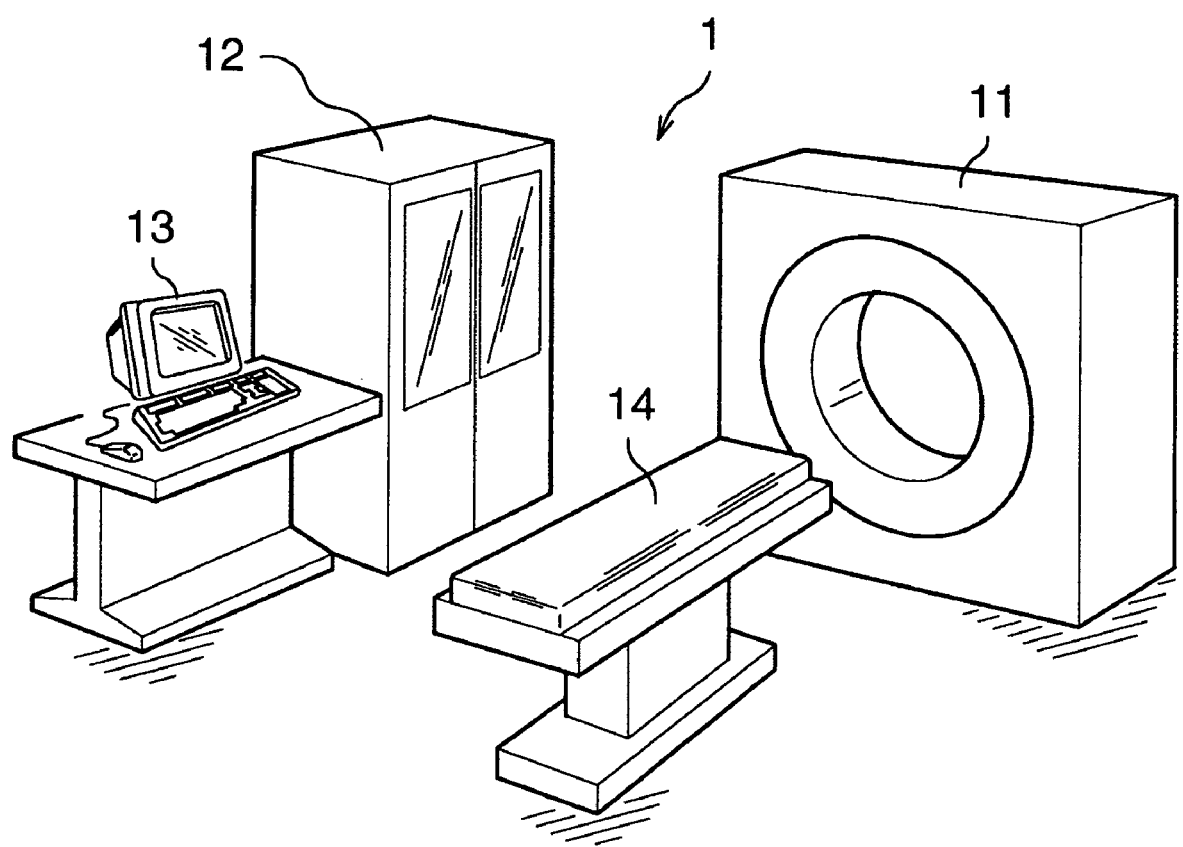
FIG. 7 is a diagram showing the appearance of a PET apparatus according to Embodiment 1.

Referring to FIG. 7 and others, a concrete example of Embodiment 1 will be discussed below.

Figure 8:
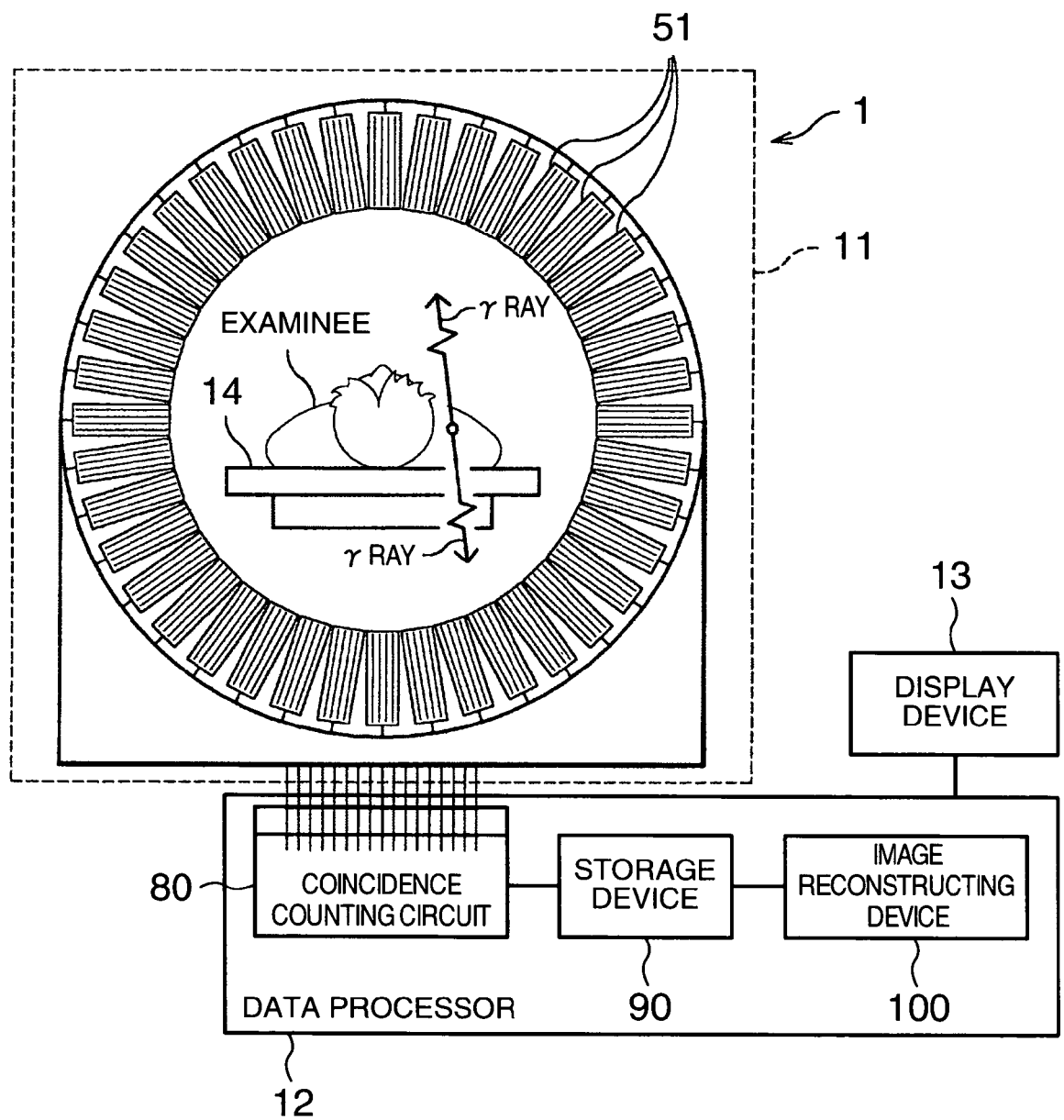
FIG. 8 is a diagram schematically showing the position relationship between a patient and the semiconductor radiation detectors of the PET apparatus shown in FIG. 7.

As shown in FIGS. 7 and 8, a PET apparatus 1 serving as a nuclear medicine diagnostic apparatus includes a camera (imaging device) 11, a data processor 12, and a display device 13. An examinee (patient) is laid on a bed 14 and is photographed by the camera 11. The camera 11 comprises a number of detectors (semiconductor radiation detectors) for detecting γ rays. The detectors detect γ rays emitted from the body of the examinee on the bed 14. The camera 11 has an integrated circuit (ASIC) for measuring a peak value and a detection time of a γ ray. The integrated circuit measures a peak value (energy) and a detection time of a detected γ ray. The data processor 12 has a coincidence counting circuit 80, a storage device 90, and an image reconstructing device 100 (FIG. 8). The data processor 12 captures a peak value of a detected γ ray, the data of a detection time, and packet data including a detector (channel) ID. The coincidence counting circuit 80 performs coincidence counting based on the packet data, particularly the data of the detection time and the detector ID (address N), locates the detection position of a γ ray of 511 keV, and stores the position in the storage device 90. The image reconstructing device 100 creates a functional image based on information stored in the storage device 90 and displays the image on the display device 13.

The semiconductor radiation detectors serving as detectors are arranged like a circle in the camera 11 so as to surround the patient. Incidentally, the patient is administered with a radioactive agent, e.g., fluorodeoxyglucose (FDG) including 18F having a half-life of 110 minutes. γ rays (annihilation γ rays) are emitted from the body of the examinee when positrons emitted from the FDG are annihilated.

Figure 9:
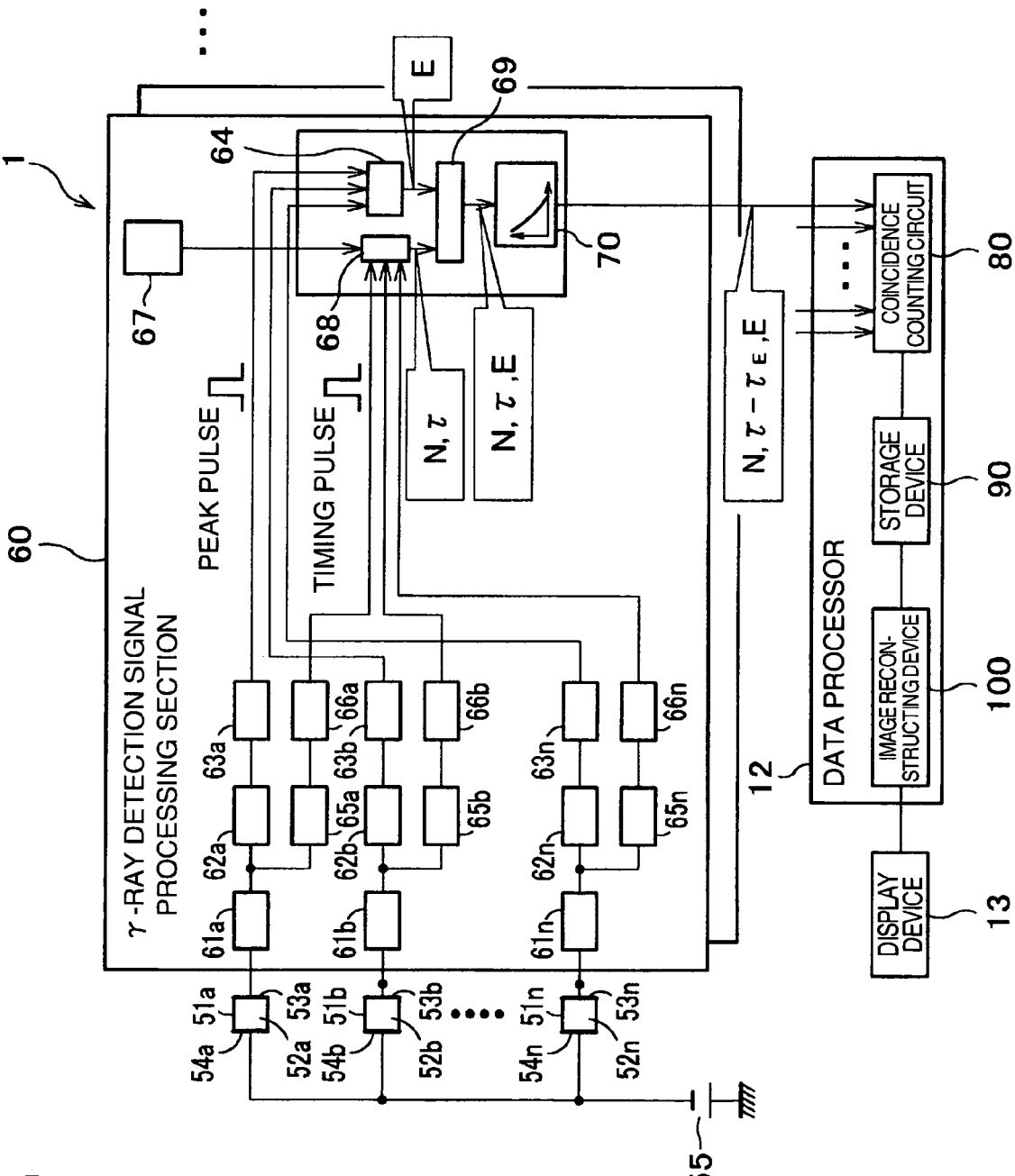
FIG. 9 is a block diagram showing a process from the detection of a γ ray to the reconstruction of an image in the PET apparatus of Embodiment 1.

As shown in FIG. 9, the PET apparatus 1 includes a γ-ray detection signal processing section 60, the coincidence counting circuit 80, the storage device 90, and the image reconstructing device 100. The γ-ray detection signal processing section 60 is provided in the camera 11. The coincidence counting circuit 80, the storage device 90, and the image reconstructing device 100 are provided in the data processor 12. The γ-ray detection signal processing section 60 and the data processor 12 (the coincidence counting circuit 80, the storage device 90, and the image reconstructing device 100) correspond to "processors." Although FIG. 9 shows only one (one system) γ-ray detection signal processing section 60, several tens (several tens systems) or more γ-ray detection signal processing sections 60 are actually provided. Thus, the coincidence counting circuit 80 comprises signal input ports as many as the γ-ray detection signal processing sections 60.

Reference numeral 51 (51a, 51b, . . . 51n) denotes a semiconductor radiation detector. In FIG. 9, subscripts a, b, . . . n of reference numerals 51, 61, and others are used when configurations are individually explained, and the subscripts are omitted in other cases.

The γ-ray detection signal processing section 60 of FIG. 9 processes a γ-ray detection signal outputted when the semiconductor radiation detector 51 detects a γ ray. The γ-ray detection signal processing section 60 includes a preamplifier circuit 61, a low-speed waveform amplifier circuit 62, a γ-ray discriminator circuit 63, a pulse-height analyzer circuit 64, a high-speed amplifier circuit 65, a time pick-off circuit 66, a high-speed clock 67, an address discriminating circuit 68, an event data output circuit 69, and a time correction circuit 70. The low-speed waveform amplifier circuit 62, the γ-ray discriminator circuit 63, and the pulse-height analyzer circuit 64 constitute a low-speed signal processing system which determines the energy (E) of a detected γ ray. The high-speed amplifier circuit 65, the time pick-off circuit 66, the high-speed clock 67, and the address discriminating circuit 68 constitute a high-speed signal processing system which determines a detection time ($\tau$) and an address of a γ ray (N→the ID of the semiconductor radiation detector which detects the γ ray). The pulse-height analyzer circuit 64 and the address discriminating circuit 68 are fed with signals from the semiconductor radiation detectors 51a, 51b, . . . 51n. In this case, the high-speed clock 67 generates a clock with a speed for determining a detection time in nsec. The preamplifier circuit 61 and so on are provided, as indicated by reference numerals 61a, 61b, . . . 61n, in the γ-ray detection signal processing section 60 as many as the semiconductor radiation detectors 51a, 51b, . . . 51n.

The semiconductor radiation detector 51 includes a semiconductor element 52, an anode 53, and a cathode 54. A voltage of several hundreds volts for collecting charge is applied between the anode 53 and the cathode 54 of the semiconductor radiation detector 51 by a voltage supply 55.

The configurations indicated by reference numerals 61 to 69 of the γ-ray detection signal processing section 60 have been already clarified by a variety of documents, and thus the detailed explanation thereof is omitted. These configurations may be replaced with other configurations different from those of FIG. 9 as long as the detection time ($\tau$) of a γ ray and the energy (E) of a detected γ ray are outputted to the time correction circuit 70.

As shown in FIG. 9, the γ-ray detection signal processing section 60 of the present embodiment comprises the time correction circuit 70. The time correction circuit 70 comprises the time correction table (not shown in FIG. 9, see FIG. 4) or time correction function and has the function of setting a correction value ($\tau_E$) of a detection time according to the energy of a γ ray. Further, the time correction circuit 70 has the function of correcting a detection time ($\tau$-$\tau_E$) by using a correction value. Incidentally, in the present embodiment, γ rays with energy of 200 keV or higher are subjected to coincidence counting. γ rays less than 200 keV are excluded out of the series of processing by, e.g., the γ-ray discriminator circuit 63 and the pulse-height analyzer circuit 64 (cut by a threshold value). γ rays less than 150 keV may be excluded out of the series of processing and γ rays of 150 keV or higher may be subjected to coincidence counting. Under normal conditions, γ rays of less than 450 keV are excluded out of the series of processing.

The address (N), the corrected detection time ($\tau$-$\tau_E$), and the energy (E) are outputted from the time correction circuit 70 to the coincidence counting circuit 80 of the data processor 12.

The coincidence counting circuit 80 has the function of coincidence counting using the first inputted signal (signals (N, $\tau$-$\tau_E$, E) from the γ-ray detection signal processing section 60 of one system) and the subsequently inputted signal (signals (N, $\tau$-$\tau_E$, E) from the γ-ray detection signal processing section 60 of another system). To be specific, the coincidence counting circuit 80 has the function of determining a detection time difference when a signal is first inputted from the γ-ray detection signal processing section 60 of one system and a signal is subsequently inputted from the γ-ray detection signal processing section 60 of another system, the function of deciding whether a detection time difference is within a time window (e.g., 8 nsec), the function of outputting the inputted address (N) of one system and the address (N) of another system to the storage device 90 in the subsequent stage when the detection time difference is within the time window, and the function of excluding the inputted signal when the detection time difference exceeds the time window.

The configuration of the coincidence counting circuit 80 has been already clarified by a variety of documents, and the configuration may be replaced with another configuration. Further, the width of the time window can be set as appropriate.

The storage device 90 stores the address (N) of the semiconductor radiation detector that has been subjected to coincidence counting. The image reconstructing device 100 reads the contents stored in the storage device 90, determines the emitting direction of a γ ray, and reconstructs a PET image. The storage device 90 and the image reconstructing device 100 are similar to conventional ones and thus the explanation thereof is omitted.

[Operations of the Concrete Example]

The following will discuss operations of the PET apparatus 1 configured as the above described concrete example (See FIGS. 4 to 9 when necessary).

When a pair of γ rays emitted from the body of the examinee are detected by the semiconductor radiation detectors 51 (the semiconductor radiation detector 51 of one system and the semiconductor radiation detector 51 of another system), each of the semiconductor radiation detectors 51 outputs a γ-ray detection signal. Regarding the outputted γ-ray detection signals, the energy of the γ ray is determined by a slow processing system of the γ-ray detection signal processing section 60 in the corresponding system, and a detection time and the address of the semiconductor radiation detector 51 are determined by a fast processing system. The detection time is corrected by the time correction circuit 70 according to the energy of the γ ray. The signal including the corrected detection time is inputted to the coincidence counting circuit 80. Then, the coincidence counting circuit 80, which have been fed with the signal from the γ-ray detection signal processing section 60 and the signal from the γ-ray detection signal processing section 60 of another system, determines a detection time difference based on the corrected detection time. When the detection time difference is within the time window, the addresses (N) of the semiconductor radiation detectors 51 having detected the pair of γ rays are outputted to the storage device 90. Then, the image reconstructing device 100 reconstructs a PET image based on data of the addresses (N) stored in the storage device 90, and displays the PET image on the display device 13.

According to Embodiment 1, a γ-ray detection signal (scattered ray) in the CS area is also used for the PET image displayed on the display device 13, thereby achieving higher sensitivity than the conventional art. Additionally, since the γ-ray detection signal in the CS area is used without expanding the time window, other γ rays are less likely to be detected spontaneously (no reduction in sensitivity). Thus, it is possible to shorten examining time and to reduce a dose of a radioactive agent administered to the examinee. The shorter examining time, the number of times of processing (the number of examinations) can be increased. Further, a smaller dose of the radioactive agent administered to the examinee results in the smaller exposure of the examinee and medical workers.

Incidentally, when none of γ rays emitted in a pair from the body of the examinee is detected, as a matter of course, any image is not reconstructed from the γ rays. Moreover, also when only one of γ rays in a pair is detected, any image is not reconstructed from the γ rays (except for spontaneous coincidence counting) in consideration of the time window of 8 nsec. According to Embodiment 1, by correcting a detection time, the time window can be set at a short time period while using scattered ray. Hence, as described above, other γ rays are less likely to be detected spontaneously.

An explanation about processing for scattered ray is omitted. The processing for scattered ray is performed according to, e.g., Compton scattering. For example, when energy of 200 keV is applied to the first semiconductor radiation detector 51 and the remainder of the energy is applied to an adjacent semiconductor radiation detector 51, both of γ rays are regarded as a single γ ray of scattered ray in view of the relationship among a total value of energy of the γ rays, a detection time, and the addresses of the semiconductor radiation detectors 51. A configuration for the scattered ray processing may be provided in, e.g., the event data output circuit 69 and the coincidence counting circuit 80 (in the previous stage of the coincidence counting circuit 80). Incidentally, when a detection time is corrected after the detection time is determined for a γ ray having been subjected to the scattered ray processing, the current configuration for the scattered ray processing is used as it is with enhanced convenience. In this case, the detection time can be corrected according to the energy and detection time of the first detected γ ray.

As a matter of course, scattered ray can be properly used without the need for a wider time window or the configuration for scattered ray processing.

Incidentally, a peak shift of FIG. 4 (a correction value of a detection time) is varied for each of the semiconductor radiation detectors 51 and the γ-ray detection signal processing sections 60, and thus statistics may be organized to absorb the individual differences.

Embodiment 2

Regarding Embodiment 2 using scattered ray with a variable time window, the following will discuss a principle, a concrete example, and the operations of the concrete example in this order. An explanation about the same parts as Embodiment 1 is omitted.

[Principle]

The principle of Embodiment 2 will be discussed below.

According to the experiments using the experimental apparatus (FIG. 1) described in Embodiment 1, the present inventors found that a difference in detection time (detection time difference) occurs according to the energy of a γ ray (FIG. 3). Based on this knowledge, a detection time is corrected in Embodiment 1 (FIGS. 4 and 5). In Embodiment 2, a time window is corrected instead of a detection time.

Figure 10:
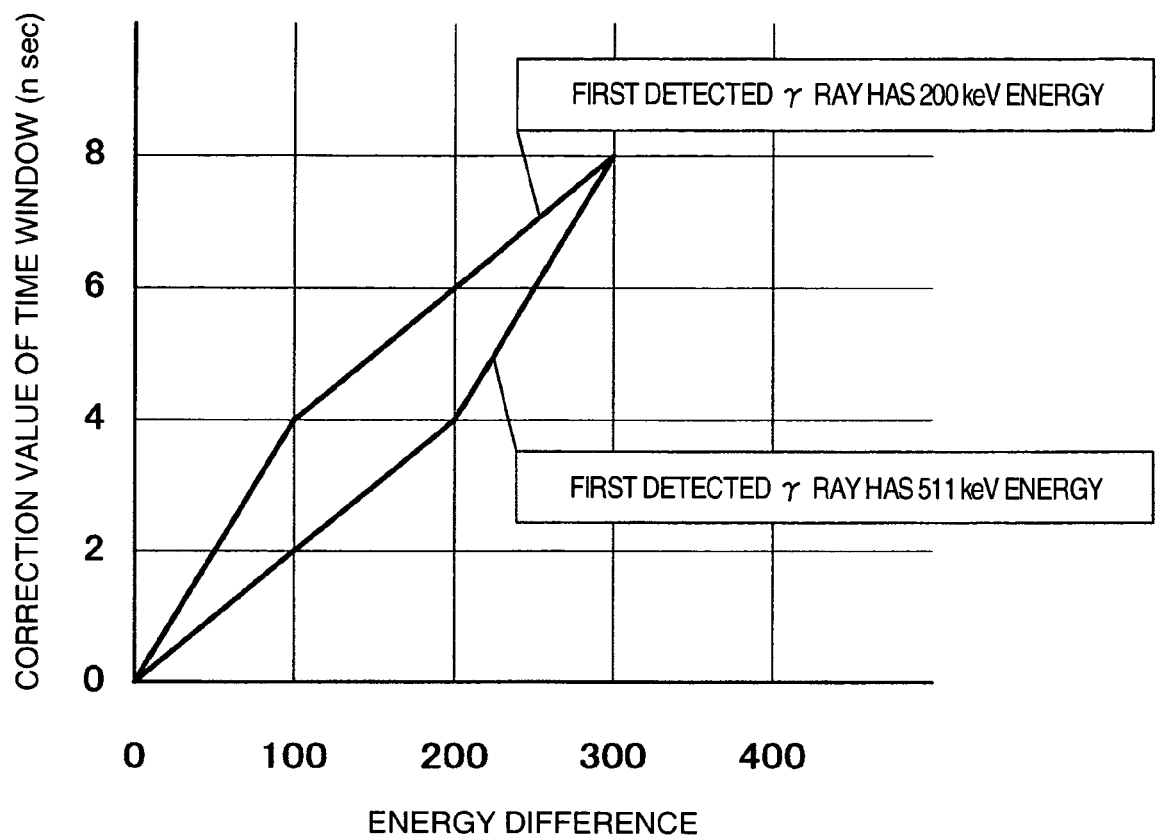
FIG. 10 is a diagram showing a time window correction table of Embodiment 2.

In FIG. 10 showing an example of a time window correction table, a horizontal axis represents a difference in energy between successively detected γ rays (keV) and a vertical axis represents a correction value (nsec) of the time window. As is understood from FIG. 10, in the case of no difference in energy between successively detected γ rays, the time window has a correction value of 0 nsec. For example, when the time window is set at 8 nsec (no difference in energy, e.g., 511 keV-511 keV and 200 keV-200 keV), the time window remains 8 nsec. When a difference in energy is 300 keV (200 keV-511 keV) between successively detected γ rays, the time window has a correction value of 8 nsec. For example, when the time window is set at 8 nsec, the time window is increased to 16 nsec.

As shown in FIG. 4, a peak shift is represented as a curve (particularly an area of 300 keV or lower). Therefore, as shown in FIG. 10, the present embodiment has a time window correction table according to the energy of the first detected γ ray (time window correction map/time window correction function) for convenience. Incidentally, when a value of the time window correction table of FIG. 10 is offset above by 8 nsec, the value of the time window can be obtained based on a difference in energy in the time window table. Although FIG. 10 shows two lines of 200 keV and 511 keV, it is preferable to provide more lines of 300 keV, 400 keV, and so on to minutely correct the time window.

[Concrete Example]

Figure 11:
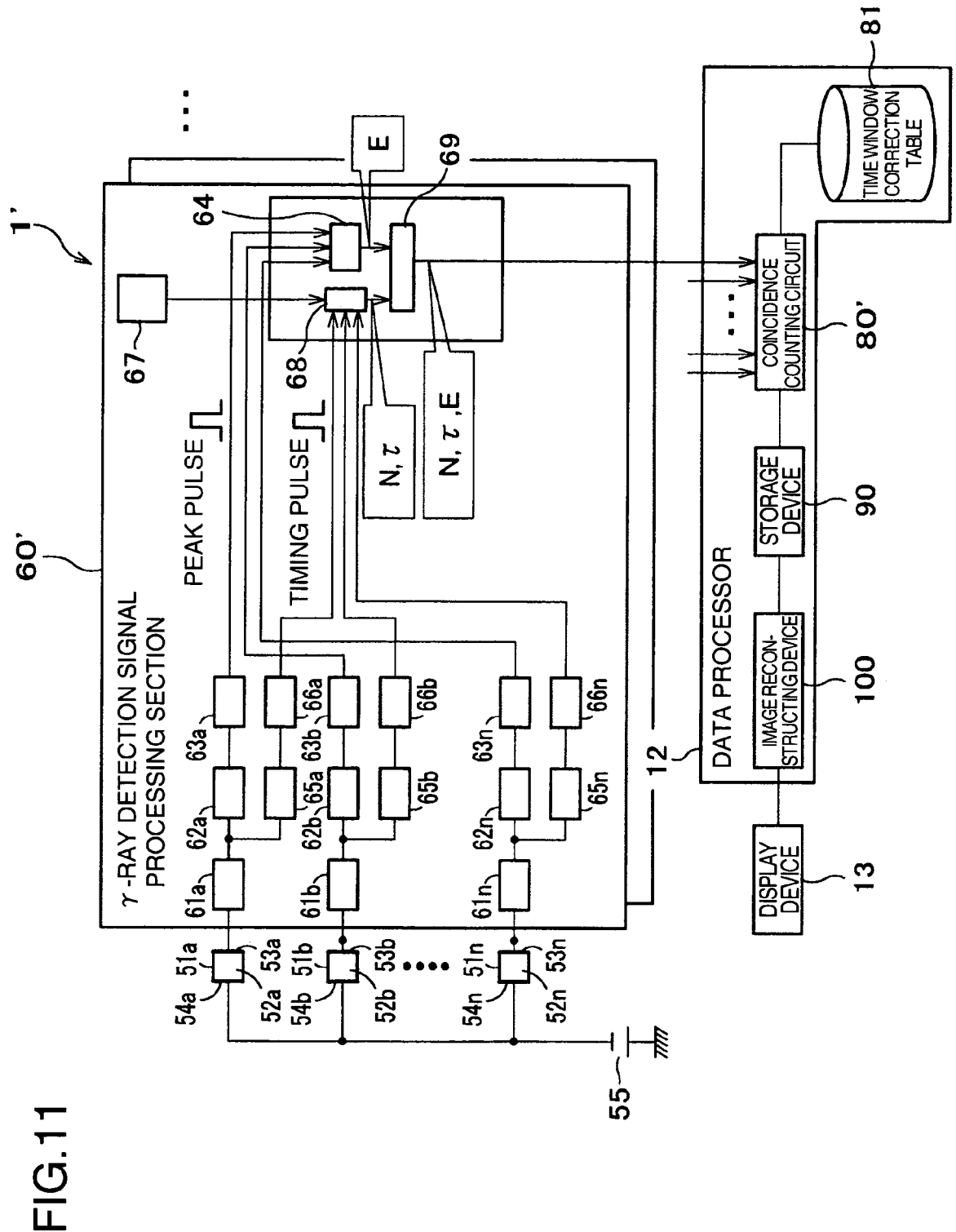
FIG. 11 is a diagram showing a process from the detection of a γ ray to the reconstruction of an image in the PET apparatus of Embodiment 2.

Referring to FIG. 11 and others, a concrete example of Embodiment 2 will be discussed below.

A PET apparatus 1' of Embodiment 2 is similar in appearance to that of Embodiment 1 (FIG. 7). As shown in FIG. 11, a γ-ray detection signal detected by a semiconductor radiation detector 51 is processed in a γ-ray detection signal processing section 60'. Unlike the γ-ray detection signal processing section 60 of Embodiment 1, the γ-ray detection signal processing section 60' has a typical configuration not having a time correction circuit 70 (or a time correction table). This is because Embodiment 2 makes a time window variable instead of correcting the detection time of a γ ray.

As shown in FIG. 11, a coincidence counting circuit 80' of Embodiment 2 comprises a time window correction table 81. The coincidence counting circuit 80' has the function of making the time window variable and performing coincidence counting using the first inputted signal (signals (N, τ, E) from the γ-ray detection signal processing section 60' of one system) and the subsequently inputted signal (signals (N, τ, E) from the γ-ray detection signal processing section 60' of another system).

To be specific, the coincidence counting circuit 80' has the function of determining a difference in energy between signals when a signal is first inputted from the γ-ray detection signal processing section 60' of one system and a signal is subsequently inputted from the γ-ray detection signal processing section 60' of another system (when signals are successively inputted), the function of obtaining a correction value of the time window, the correction value corresponding to the energy difference from the time correction table according to the energy difference, the function of correcting the time window according to the correction value of the time window and making the time window variable, the function of determining a detection time difference between γ rays of the systems, the function of deciding whether the detection time difference is within the variable time window, the function of outputting the inputted address (N) of one system and the address (N) of another system to a storage device 90 in the subsequent stage when the detection time difference is within the time window, and the function of excluding the inputted signal when the detection time difference exceeds the time window.

The storage device 90 and an image reconstructing device 100 are similar to those of Embodiment 1 and thus the explanation thereof is omitted.

[Operations of the Concrete Example]

The following will discuss the operations of the PET apparatus 1' configured as the above described concrete example (See FIGS. 10 and 11 when necessary).

When a pair of γ rays emitted from the body of an examinee are detected by the semiconductor radiation detectors 51 (the semiconductor radiation detector 51 of one system and the semiconductor radiation detector 51 of another system), each of the semiconductor radiation detectors 51 outputs a γ-ray detection signal. Regarding the outputted γ-ray detection signal, the energy (E) of the γ ray is determined by a slow processing system of the γ-ray detection signal processing section 60' in the corresponding system, and the detection time (τ) and the address (N) of the semiconductor radiation detector 51 are determined by a fast processing system.

Then, the coincidence counting circuit 80', which have been successively fed with the signal (N, τ, E) from the γ-ray detection signal processing section 60' and the signal (N, τ, E) from the γ-ray detection signal processing section 60' of another system, determines a difference in energy, obtains a correction time of the corresponding time window from the time window correction table, and corrects the time window (makes variable). Meanwhile, a detection time difference is determined. When the detection time difference is within the variable time window, the addresses (N) of the semiconductor radiation detectors 51 having detected the pair of γ rays are outputted to the storage device 90. Then, the image reconstructing device 100 reconstructs a PET image based on data of the addresses (N) stored in the storage device 90, and displays the PET image on the display device 13.

According to Embodiment 2, a γ-ray detection signal (scattered ray) of the CS area is also used for the PET image displayed on the display device 13, thereby achieving higher sensitivity than the conventional art. Additionally, the width of the time window is made variable according to the difference in the energy of γ rays, and thus the γ-ray detection signal can be used with a small increase in the time window. Hence, other γ rays are less likely to be spontaneously detected (a smaller reduction in sensitivity). Thus, it is possible to shorten examining time of a camera 11 (FIG. 7) and to reduce a dose of a radioactive agent administered to an examinee. As the examining time decreases, the number of times of processing (the number of examinations) per hour can be increased for the examinee. Further, as the dose of the radioactive agent administered to the examinee decreases, the exposure of the examinee and medical workers can be reduced.

Scattering radiation processing is similar to that of Embodiment 1. A difference in energy is varied for each of the semiconductor radiation detectors 51 and the γ-ray detection signal processing sections 60', and thus statistics may be organized to absorb the individual differences as in Embodiment 1.

<Supplementary Explanation>

A supplementary explanation will be made on a method of determining the detection time of a γ ray.

Figure 12A:
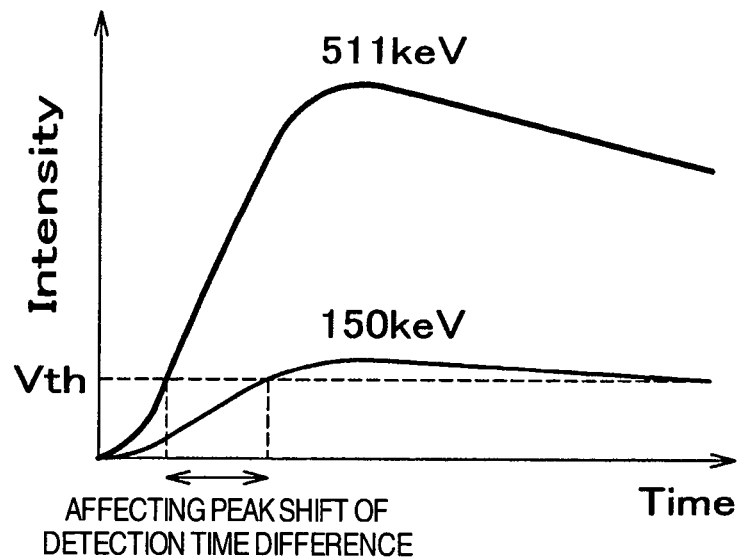
FIGS. 12A and 12B are diagrams for explaining methods of determining the detection time of a γ ray, FIG. 12A schematically shows the principle of a LET method.
Figure 12B:
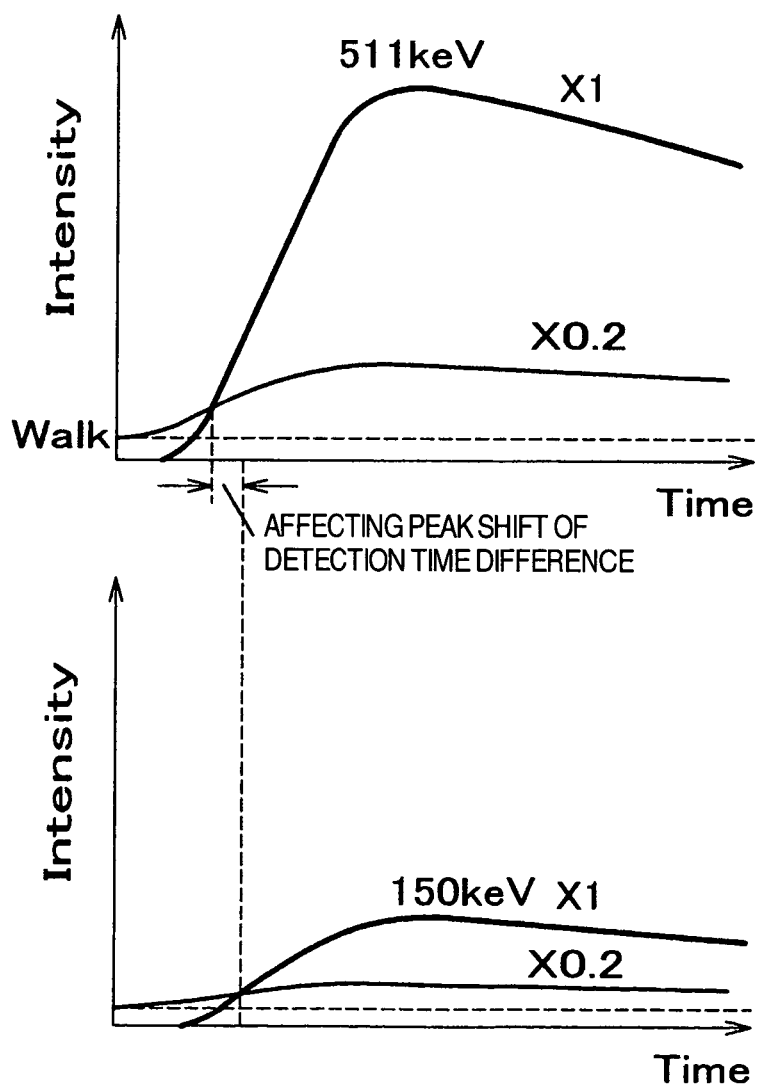

The method of determining the detection time of a γ ray is broadly classified as Leading Edge Trigger (LET) whose principle is schematically shown in FIG. 12A and Constant Fraction Discriminator (CFD) whose principle is schematically shown in FIG. 12B.

As shown in FIG. 12A, the LET is a method of determining the detection time of a γ ray, in which a detection time is determined when the energy (intensity) of a γ ray rises and reaches a set threshold value (Vth). According to the LET method, a detection time can be swiftly determined with ease, whereas the detection time of a low energy γ ray tends to be delayed as compared with a high energy γ ray.

FIG. 12B shows time-energy (intensity) curves of γ rays according to the CFD method. A curve obtained by multiplying measurement values by, e.g., 0.2 times and a curve with unchanged measurement values are shifted in the horizontal axis (time base) direction, the curves are shifted also in the vertical axis direction (add Walk), and the intersection of the curves is determined as the detection time of the γ ray. According to the CFD method, a difference in detection time can be small from low energy γ rays to high energy γ rays. However, a difference in detection time still occurs because of Walk (offset voltage).

The present invention is applicable to both of the methods, and particularly the LET method is effective. Incidentally, a detection time of a γ ray is determined by the LET method in Embodiment 1 and Embodiment 2. The operations of the LET and CFD methods are performed in a time pick-off circuit 66 shown in FIG. 9.

The present invention described above is not limited to Embodiment 1 and Embodiment 2. Variations may be made within the scope of the technical idea.

For example, when coincidence counting is performed only by using γ rays in the PP area, a time window may be narrowed by using the configurations of Embodiment 1 and Embodiment 2.

Further, the present invention is also applicable to a radiation detector such as a scintillator other than the semiconductor radiation detector.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method of determining a detection time of γ ray in a nuclear medicine diagnostic apparatus constructing a functional image by processing γ ray detection signals output from a plurality of sensors for detecting γ rays, comprising the steps of:
   determining energy of γ rays on the basis of said γ ray detection signals output from said sensors; and
   determining a γ ray detection time on the basis of said γ ray detection signals and said energy of γ rays.

2. A method of determining a detection time of γ ray in a nuclear medicine diagnostic apparatus constructing a functional image by processing γ ray detection signals output from a plurality of sensors for detecting γ rays, comprising the steps of:
   measuring a γ ray detection time on the basis of said γ ray detection signals output from said sensors;
   determining energy of γ rays on the basis of said γ ray detection signals; and
   correcting said γ ray detection time measured on the basis of said energy of γ rays.

3. A method of determining a detection time of γ ray in a nuclear medicine diagnostic apparatus constructing a functional image by processing γ ray detection signals output from a plurality of sensors for detecting γ rays, comprising the steps of:
   measuring a γ ray detection time on the basis of said γ ray detection signals output from said sensors;
   determining energy of γ rays on the basis of said γ ray detection signals; and
   correcting said γ ray detection time measured using a correction value of a detection time corresponding to said energy of γ rays.

4. A coincidence counting method of γ rays in a nuclear medicine diagnostic apparatus constructing a functional image by processing γ ray detection signals output from a plurality of sensors for detecting γ rays, comprising the steps of:
   determining energy of γ rays on the basis of said γ ray detection signals output from said sensors;
   determining a γ ray detection time on the basis of said γ ray detection signals and said energy of γ rays; and
   executing coincidence counting of γ rays on the basis of said detection time.

5. A coincidence counting method of γ rays in a nuclear medicine diagnostic apparatus constructing a functional image by processing γ ray detection signals output from a plurality of sensors for detecting γ rays, comprising the steps of
   measuring a γ ray detection time on the basis of said γ ray detection signals output from said sensors;
   determining energy of γ rays on the basis of said γ ray detection signals;
   correcting γ ray detection time measured on the basis of said energy of γ rays; and
   executing coincidence counting of γ rays on the basis of a detection time obtained in said correcting step.

6. The coincidence counting method of γ rays according to claim 5, wherein said step of executing coincidence counting comprises a step of judging said γ rays as being coincident, when a difference between detection times obtained in said step of correcting is smaller than a predetermined time window.

7. The coincidence counting method of γ rays according to claim 5, wherein said step of executing coincidence counting comprises a step of deciding whether or not said γ rays detected should be subjected to coincidence counting as scattered radiations on the basis of γ ray detection time obtained in said correcting step and said determined energy.

8. The coincidence counting method of γ rays according to claim 5, wherein said step of executing coincidence counting comprises a step of removing said γ rays from γ rays to be subjected to coincidence counting, when said energy of said γ rays determined is below a predetermined threshold value.

9. A coincidence counting method of γ rays in a nuclear medicine diagnostic apparatus constructing a functional image by processing γ ray detection signals output from a plurality of sensors for detecting γ rays, comprising the steps of:
   measuring a γ ray detection time on the basis of said γ ray detection signals output from said sensors;
   determining energy of γ rays on the basis of said γ ray detection signals;
   correcting said γ ray detection time measured using a correction value of a detection time corresponding to said energy of γ rays; and
   executing coincidence counting of γ rays on the basis of a detection time obtained in said correcting step.

10. The coincidence counting method of γ rays according to claim 9, wherein said correction value and said energy of γ rays are correlated in a manner that the smaller said energy of said γ rays, the larger said correction value to be subtracted from said detection time.

11. A nuclear medicine diagnosis apparatus comprising:
   a plurality of sensors for detecting γ rays;
   an energy determination unit for determining energy of said γ rays on the basis of γ ray detection signals output from said sensors;
   a time determination unit for determining a γ ray detection time on the basis of said γ ray detection signals and said energy of γ rays; and
   a coincidence counting unit for executing coincidence counting of said γ rays on the basis of said γ ray detection time.

12. The nuclear medicine diagnosis apparatus according to claim 11, further comprising a decision unit for deciding as to whether or not said γ rays detected should be subjected to coincidence counting on the basis of said γ ray detection time and said energy of γ rays.

13. The nuclear medicine diagnosis apparatus according to claim 11, wherein said γ rays are removed from γ rays to be subjected to coincidence counting, when said energy of γ rays is below a predetermined threshold value.

14. A nuclear medicine diagnosis apparatus comprising:
a plurality of sensors for detecting γ rays;
a detection time measurement unit for measuring a γ ray detection time on the basis of γ ray detection signals output from said sensors;
an energy determination unit for determining energy of γ rays on the basis of said γ ray detection signals;
a detection time correction unit for correcting said γ ray detection time on the basis of said energy of γ rays; and
a coincidence counting unit for executing a coincidence counting of γ rays on the basis of a γ ray detection time obtained in said means for correcting.

15. The nuclear medicine diagnosis apparatus according to claim 14, wherein said coincidence counting unit judges said γ rays as being coincident when a difference between γ ray detection times obtained in said detection time correction unit is smaller than a predetermined time window and executes the coincidence counting.

16. A nuclear medicine diagnosis apparatus comprising:
a plurality of sensor for detecting γ rays;
a detection time measurement unit for measuring a γ ray detection time on the basis of γ ray detection signals output from said sensors;
an energy determination unit for determining energy of said γ rays on the basis of said γ ray detection signals;
a detection time correction unit for correcting said γ ray detection time using a correction value of a γ ray detection time corresponding to said energy of γ rays; and
a coincidence counting unit for executing a coincidence counting of γ rays on the basis of a γ ray detection time obtained in said means for correcting.

* * * * *